(12) United States Patent
Perreault

(10) Patent No.: US 11,524,262 B2
(45) Date of Patent: Dec. 13, 2022

(54) DEVICES, SYSTEMS, AND METHODS FOR CONTINUOUS PROCESSING WITH ALTERNATING TANGENTIAL FLOW

(71) Applicant: REPLIGEN CORPORATION, Waltham, MA (US)

(72) Inventor: Mark A. Perreault, Leominster, MA (US)

(73) Assignee: REPLIGEN CORPORATION, Waltham, MA (US)

(*) Notice: Subject to any disclaimer, the term of this patent is extended or adjusted under 35 U.S.C. 154(b) by 37 days.

(21) Appl. No.: 16/940,764

(22) Filed: Jul. 28, 2020

(65) Prior Publication Data

US 2021/0039045 A1 Feb. 11, 2021

Related U.S. Application Data

(60) Provisional application No. 62/882,783, filed on Aug. 5, 2019.

(51) Int. Cl.
*B01D 61/14* (2006.01)
*B01D 61/18* (2006.01)
(Continued)

(52) U.S. Cl.
CPC ........... *B01D 61/146* (2022.08); *B01D 61/18* (2013.01); *B01D 61/22* (2013.01); *B01D 63/16* (2013.01);
(Continued)

(58) Field of Classification Search
CPC ...... B01D 61/142; B01D 61/18; B01D 61/22; B01D 63/16; B01D 2311/16;
(Continued)

(56) References Cited

U.S. PATENT DOCUMENTS 5,984,960 A 11/1999 Vitale
6,544,424 B1 4/2003 Shevitz
(Continued)

FOREIGN PATENT DOCUMENTS

KR 20150004333 A 1/2015
WO WO2013106458 A2 * 7/2013

OTHER PUBLICATIONS

International Search Report and Written Opinion dated Dec. 18, 2020 for PCT/US20/43838.
(Continued)

*Primary Examiner* — Pranav N Patel
(74) *Attorney, Agent, or Firm* — KDB Firm PLLC

(57) ABSTRACT

The present disclosure relates to tangential flow filters, membranes, and ultrafiltration membranes, for various applications, including bioprocessing and pharmaceutical applications, systems employing such filters, and methods of filtration using the same. In an aspect, an alternating tangential flow system for continuous processing may include a feed line containing a fluid. A retentate line may be in fluid communication with the feed line. A first diaphragm may be at an inlet of the retentate line configured to pump fluid toward an outlet of the retentate line. A second diaphragm may be at the outlet of the retentate line configured to pump fluid toward the inlet of the retentate line. A membrane may be in fluid communication with the retentate line between the first diaphragm and the second diaphragm. A retentate pump may be at the retentate outlet configured to pump the fluid out of the retentate line.

20 Claims, 4 Drawing Sheets

(51) Int. Cl.
  *B01D 61/22* (2006.01)
  *B01D 63/16* (2006.01)
  *B01D 65/08* (2006.01)

(52) U.S. Cl.
  CPC ...... *B01D 2311/16* (2013.01); *B01D 2311/25* (2013.01); *B01D 2313/243* (2013.01); *B01D 2317/02* (2013.01); *B01D 2317/06* (2013.01); *B01D 2321/2025* (2013.01)

(58) Field of Classification Search
  CPC .......... B01D 2311/25; B01D 2313/243; B01D 2317/02; B01D 2317/06; B01D 2321/2025; B01D 65/08; B01D 2321/2083; B01D 2315/10
  See application file for complete search history.

(56) References Cited

U.S. PATENT DOCUMENTS

| | | | |
|---|---|---|---|
| 2013/0059371 A1* | 3/2013 | Shevitz | B01D 61/14 210/257.2 |
| 2013/0270165 A1 | 10/2013 | Shevitz | |
| 2015/0083665 A1* | 3/2015 | Oranth | B01D 61/22 210/138 |
| 2015/0247114 A1 | 9/2015 | Gebauer | |
| 2018/0238317 A1 | 8/2018 | Ward et al. | |
| 2019/0201819 A1 | 7/2019 | Pavlik | |

OTHER PUBLICATIONS

European Search Report and Written Opinion for Application No. 20849913, dated Jul. 15, 2022, 13 pages.

* cited by examiner

DEVICES, SYSTEMS, AND METHODS FOR CONTINUOUS PROCESSING WITH ALTERNATING TANGENTIAL FLOW

PRIORITY

This application claims the benefit of priority to, U.S. Provisional Patent Application No. 62/882,783, filed Aug. 5, 2019, entitled "DEVICES, SYSTEMS, AND METHODS FOR CONTINUOUS PROCESSING WITH ALTERNATING TANGENTIAL FLOW," which application is incorporated herein by reference in its entirety.

FIELD

The present disclosure relates to tangential flow filters, membranes, and ultrafiltration membranes, for various applications, including bioprocessing and pharmaceutical applications, systems employing such filters, and methods of filtration using the same.

BACKGROUND

The present disclosure relates to tangential flow filters, membranes, and ultrafiltration membranes, for various applications, including bioprocessing and pharmaceutical applications, systems employing such filters, and methods of filtration using the same. In various processes, a retentate concentration may be desirable. However, the desirable retentate concentration may require multiple batch processes, extended periods of time, and/or a break in the process to clean or replace system parts.

It is with respect to these considerations that the devices, systems, and methods of the present disclosure may be useful.

SUMMARY

Continuous processing systems with alternating tangential flow may be installed in fluid communication with upstream and/or downstream processes. In an aspect of an embodiment describe herein, an alternating tangential flow system for continuous processing may include a feed line containing a fluid. A retentate line may be in fluid communication with the feed line. A first diaphragm (e.g., a diaphragm pump) may be at an inlet of the retentate line configured to pump fluid toward an outlet of the retentate line. A second diaphragm may be at the outlet of the retentate line configured to pump fluid toward the inlet of the retentate line. A membrane may be in fluid communication with the retentate line between the first diaphragm and the second diaphragm. A retentate pump may be at the retentate outlet configured to pump the fluid out of the retentate line.

In various embodiments, the first diaphragm and the second diaphragm may be synchronized with each other in an alternating fashion. A flux of the retentate pump may be less than each of a flux of the first diaphragm and a flux of the second diaphragm. The feed line may be in fluid communication with a first fluid system process and the retentate line is in fluid communication with a second fluid system process. A fluid volume of each of the first diaphragm and the second diaphragm may be more than a volume of a portion of the retentate line that is within the membrane. A metering valve may be at the retentate outlet. A flux of the feed line may be substantially equal to a flux of the fluid of the retentate outlet. A filtrate line may be in fluid communication with the membrane. A first sensor may be in line with the filtrate line. A second sensor may be at the retentate outlet.

In an aspect, an alternating tangential flow device for continuous processing may include a housing having a first end and a second end. A membrane may be disposed within the housing. The membrane may have a retentate flow path. An inlet may be at the first end of the housing in fluid communication with the retentate flow path. A retentate outlet may be at the second end of the housing in fluid communication with the retentate flow path. A filtrate outlet may be in the housing and may be in fluid communication with the retentate flow path across the membrane. A first diaphragm may be at an inlet configured to pump fluid toward the retentate outlet. A second diaphragm may be at the retentate outlet configured to pump fluid toward the inlet. A fluid volume of each of the first diaphragm and the second diaphragm may be more than a volume of the retentate flow path within the membrane. The first diaphragm and the second diaphragm may each be configured to synchronize with each other in an alternating fashion. A metering valve may be at the retentate outlet.

In an aspect, a method of alternating tangential flow may include feeding a fluid directly from a first fluid process into fluid communication with a membrane. The fluid may be reciprocated tangentially across a membrane. The fluid may be pumped directly from the membrane to a second fluid process.

In various embodiments, a flux of the fluid reciprocating tangentially across the membrane may be adjusted such that a desired concentration of fluid is pumped from the membrane to the second fluid process. A flux of the fluid pumped from the membrane to the second fluid process may be less than a flux of the reciprocating fluid. The second fluid process may include reciprocating the fluid tangentially across another membrane. The reciprocating step may be performed continuously for more than 24 hours. A ratio of a filtrate fluid flow across the membrane to the fluid flow pumped to the second fluid process may be adjusted to adjust a concentration factor of the fluid pumped to the second fluid process. A flux of the fluid may be metered to the second fluid process. A feeding rate of the fluid in the feeding step may be increased. A frequency of the reciprocating fluid may be increased.

BRIEF DESCRIPTION OF THE DRAWINGS

The above and other aspects of the present disclosure will be more apparent from the following detailed description, presented in conjunction with the following drawings wherein.

DETAILED DESCRIPTION

Overview

Creating an end product may require processing a fluid to a desirable concentrate. This concentrate may not be obtainable in a single process, requiring multiple passes and/or batches through one or more processes. The fluid may require multiple batch processing steps that may need to be setup, operated, monitored, stopped, cleaned, or replaced to achieve the desired product.

Tangential flow filtration devices using membranes, e.g., ultrafiltration membranes, may be used in the biological pharmaceuticals industry to concentrate and diafiltrate process streams. These processes may be operated in batches and are independently operated without being in fluid communication with sequential processes that are upstream or downstream of the batch process. Such batch processes are time consuming, costly, require frequent maintenance, among other shortcomings.

For example, in single pass tangential flow filtration (SPTFF) a series of filters may be employed to consecutively filter a fluid's retentate concentration to achieve a desired concentration. However, a retentate flow from one filter determines the feed flow for the next filter consecutively down the line of the filter series. As fluid flow and viscosity varies down the line of filters, each filter parameters may need refinement. For example, the length and diameter of filters, housings, and tubing may need to be adjusted prior to running SPTFF, which must be configured upfront and may not be adjusted, e.g., to fine-tune a concentration.

As used herein, the term "diaphragm" may be understood by a person having ordinary skill in the art to be an elastic member for displacing fluid, a component of a pump, a pump, and/or used interchangeably with the term "diaphragm pump" depending on context.

Figure 1:
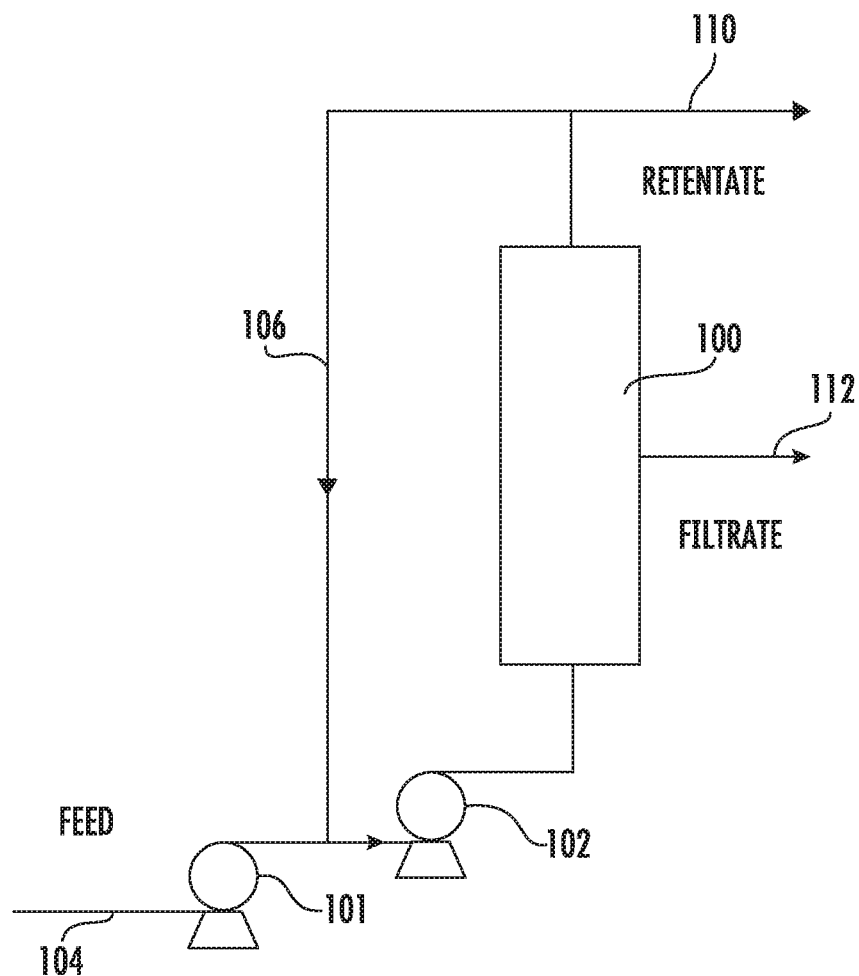
FIG. 1 is a schematic of a "feed and bleed" tangential flow process.

In another example, with reference to FIG. 1, a prior art "feed and bleed" looped process schematic is illustrated, which includes a feed line 104 with a first pump 101 controlling the flowrate of the feed line 104 into the process toward a second pump 102. The second pump 102 controls a flowrate of the fluid to a filter 100. The filter 100 is configured to remove a filtrate 112 from the fluid across the filter 100. A return line 106 directs fluid from the filter 100 back toward the second pump 102 to be reprocessed by the filter 100. This single direction flow from the second pump 102 through the filter 100 requires multiple reprocessing looped passes through the filter 100 to obtain a desired concentration. The process may be stopped and a retentate line 110 may be opened to drain the fluid that has been thoroughly processed to the desired concentration level.

Therefore, there is a need in the bioprocessing industry for an alternating tangential flow system for continuous processing. Exemplary embodiments discussed herein include parameters and operating variables that address these needs.

Exemplary Embodiments

Figure 2:
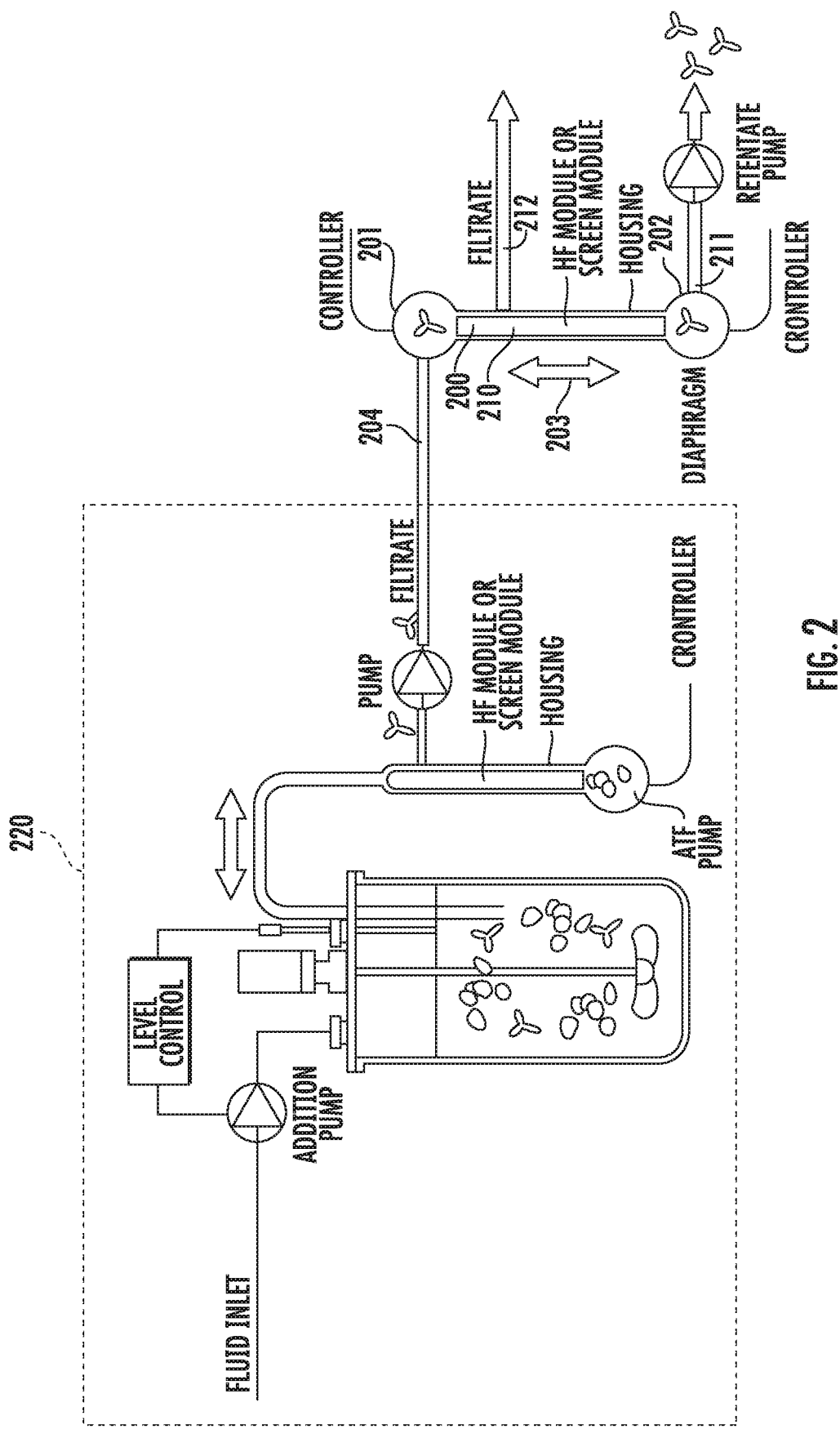
FIG. 2 is a schematic of an alternating tangential flow system for continuous processing, in accordance with an embodiment of the present disclosure.

A schematic of an alternating tangential flow system for continuous processing in accordance with an embodiment of the present disclosure is shown in FIG. 2, which includes a feed line 204 containing a fluid. The fluid may be from an upstream process 220, e.g., a screening process, a concentration process, filtration, microfiltration, clarification, or the like. A flow rate of the upstream process 220 may dictate a flowrate through the alternating tangential flow continuous processing system or at least a flowrate of the feed line 204. A retentate line 210 is in fluid communication with the feed line 204. A first pump 201 (e.g., a diaphragm) is at an inlet of the retentate line 210 and is configured to pump the fluid toward an outlet 211 of the retentate line 210. A second diaphragm 202 is at the outlet 211 of the retentate line configured to pump fluid toward the inlet of the retentate line 210. A membrane 200 within a housing is in fluid communication with the retentate line 210 between the first diaphragm 201 and the second diaphragm 202. The housing has an inlet and an outlet each in fluid communication with the retentate flow path 210 and the membrane 200. A filtrate line 212 is in fluid communication with the membrane 200. The first and second pumps 201, 202 may each push the fluid within the retentate line 210 at the membrane 200 in a synchronized, alternating fashion. The first pump 201 may push fluid through the retentate flow path 210 at the filter 200 toward the second pump 202 and the second pump 202 may push fluid toward the first pump 201, each along the directional arrows 203. The first and second pumps 201, 202 translate the fluid tangentially along the membrane 200 such that a shear force is generated between the fluid and the membrane 200 and a filtrate is filtered out through the membrane 200 and out of the process system via the filtrate line 212. This back-and-forth 203 pushing of the first and second pumps 201, 202 does not rely on a vacuum pull (such as with, e.g., a single pump filtration system) that may increase filter fouling and may decrease fluid viscosity. The retentate outlet 211 may be restricted such that an amount of fluid pressure is built up in the retentate line 210 at the membrane 200 such that the fluid has a desirable concentration flowing out of the retentate outlet 211 for collection or to transfer immediately to another downstream process. A retentate pump is at the retentate outlet 211 and is configured to pump the fluid out of the retentate line 210 and may be a metering pump or may include a metering valve. The retentate pump at the retentate outlet 211 may produce a lower flow rate than the flow rate at the feed line 204, reducing the retentate flow through the process system. For example, a 10:1 ratio may be employed (e.g., 10 L/min. through the feed line 204 or retentate inlet, 1 L/min. through the retentate outlet 211, and 9 L/min. though the filtrate line 212). The retentate fluid outlet 211 flow rate, such as in this example, and the feed line 204 flow rate may both be maintained substantially stable such that another processing system may be installed immediately upstream from the feed line 204 and/or downstream from the retentate outlet 211 without the need for batch processing. For example, this continuous alternating tangential flow processing system may be placed in fluid communication and in series with a complete purification process system. A retentate sensor may be in line with the retentate outlet 211 and a filtrate sensor may be in line with the filtrate line 212 that may provide feedback to a controller to control the first and second pumps 201, 202 to adjust the flowrates of the fluid through the retentate line 211 and filtrate line 212.

A pump of a system embodiment of the present disclosure may be a variety of pump types. For example, a diaphragm, a linear pump, a piston pump, a plunger pump, a gear pump, an axial-flow pump, a lobe pump, a pump-jet, a screw pump, a piezoelectric pump, a centrifugal pump, or the like. A pump may have a receptacle volume to accept a fluid that is a larger volume than the volume of the retentate line at a membrane.

A flowrate, flux, pressure, viscosity, or the like of a fluid at a feed line, a retentate line, filtrate line, or any inlet or outlet of the lines thereof or the like may be adjusted by controlling one or more pumps in an embodiment of a system herein. For example, a frequency, speed, force, stroke length, pressure, or the like of a diaphragm may be manually or automatically adjusted. These adjustments may be dynamic to maintain one or more parameters during a process. One or more sensors may be installed in fluid communication with flow lines or pumps that may communicate fluid properties to a controller. A controller may monitor flow rates, pressure, flux, or the like of fluid lines or pumps and may use the monitored data to control one or more pumps to achieve, e.g., a desired flow rate property or concentration of a fluid. A controller may be used to control one or more pumps to synchronize in an alternating fashion by actuating the pumps sequentially or by timing each pump such that it actuates in synchronization with other pump(s).

A system's operation may be described by using process flow conversion ratios (CR), two different variations are defined below. The concentration factor ($C_{fac}$) of a continuous tangential flow filtration (TFF) process may be calculated using a "primary" conversion ratio $CR_{(1)}$ and refers to the rate retentate is being generated as compared to the rate feed flow is entering the unit operation. It would apply to the relative concentration factor of the unit operation when a molecule is completely retained by the membrane. The concentration factor of a continuous TFF process operation is calculated using the fraction of the feed flow ($Q_F$) as it is split and the concentrate continuously exits the retentate outlet ($Q_R$) of the filter. This "primary" conversion ratio is defined as $CR_{(1)}=Q_F/Q_R$ where the ratio of a feed flow rate entering the filter is divided by the retentate exiting the filter and dictates the concentration factor achieved for the operation. For example; the feed flow rate entering the continuous TFF process is 20 LPM, the retentate flow is 1 LPM, and the filtrate flow from the process is 19 LPM. The process conversion rate is 20:1 and yields a 20× concentration factor. The typical primary process conversion ratio could range from 2:1 (a 2× concentration factor) up as high as 200:1 (a 200× concentration factor). Additionally, one of a tangential flow filtration (TFF) system's (e.g., a housing containing a membrane filter and having a feed inlet, a filtrate outlet, and a retentate outlet, i.e., a "cassette") critical operating parameters may be defined using a "secondary" conversion ratio $CR_{(2)}$ and refers to the rate filtrate is being generated as compared to the rate fluid is being pumped back and forth across the membrane's surface in the retentate and/or feed channel. The conversion ratio within the filtration cassette refers to the fraction of the feed and/or retentate flow that passes through the membrane to the filtrate outlet. The equation $CR_{(2)}=Q_f/Q_F$ establishes the ratio of a filtrate being generated to the feed flow rate (i.e., the rate of the filtrate line outlet flow over the rate of the flow back and forth within the retentate and/or feed channel across the membrane surface). This pumping rate is proportional to the velocity across the membrane surface within the retentate and/or feed channel and influences gel layer polarization of the membrane filter. If the displacement of a diaphragm chamber is specified as 4 L and the diaphragm is reciprocating 50 times every minute, the feed and/or retentate flow rate is 200 liters per minute. Continuing from the example above, the filtrate is flowing at 19 liters per minute, and the conversion ratio is now approximately 1:10 within the feed/retentate channel. This relationship is important with respect to gel layer formation and membrane fouling. Typical "cassette" conversion ratios might range from 1:2 to as low as 1:100 as the pumping rate across the surface remains constant and the filtrate flow drops during the concentration process.

A flowrate across an embodiment of a process of the present disclosure may remain substantially constant. For example, a feed line and a retentate line outlet may have a substantially similar flow rate, whereas other process systems, e.g., in series may drastically reduce in flow rate between the initial feed line flow rate and the outlet at the end of the series where a concentration is reached. For example, an incoming process stream (such as in a feed line) may vary in concentration and a flowrate produced by a first and a second pump of a process system embodiment may be adjusted to maintain a conversion ratio to produce a desired concentration at the retentate outlet. Alternatively, a flowrate of a feed line may be substantially maintained that is larger than a flowrate of a retentate outlet.

A system herein may be standalone, may be upstream from and in fluid communication with another system, and/or may be downstream from and in fluid communication with another system. A flow rate of a feed line of a system may depend on the output of an upstream system. A flowrate of a retentate outlet may depend on the feed line of a downstream system.

Gel layer polarization of membranes may occur and may build up to cause membrane fouling or plugging. However, in various embodiments of the present disclosure, the reciprocating flow of fluid in a retentate line, e.g., between two pumps, assists in stripping away gel layer build up on the membrane, and/or a lower flux throughout the system compared to batch systems, may reduce fouling and may allow for extended operation with the membrane without cleaning or replacement.

Figure 3:
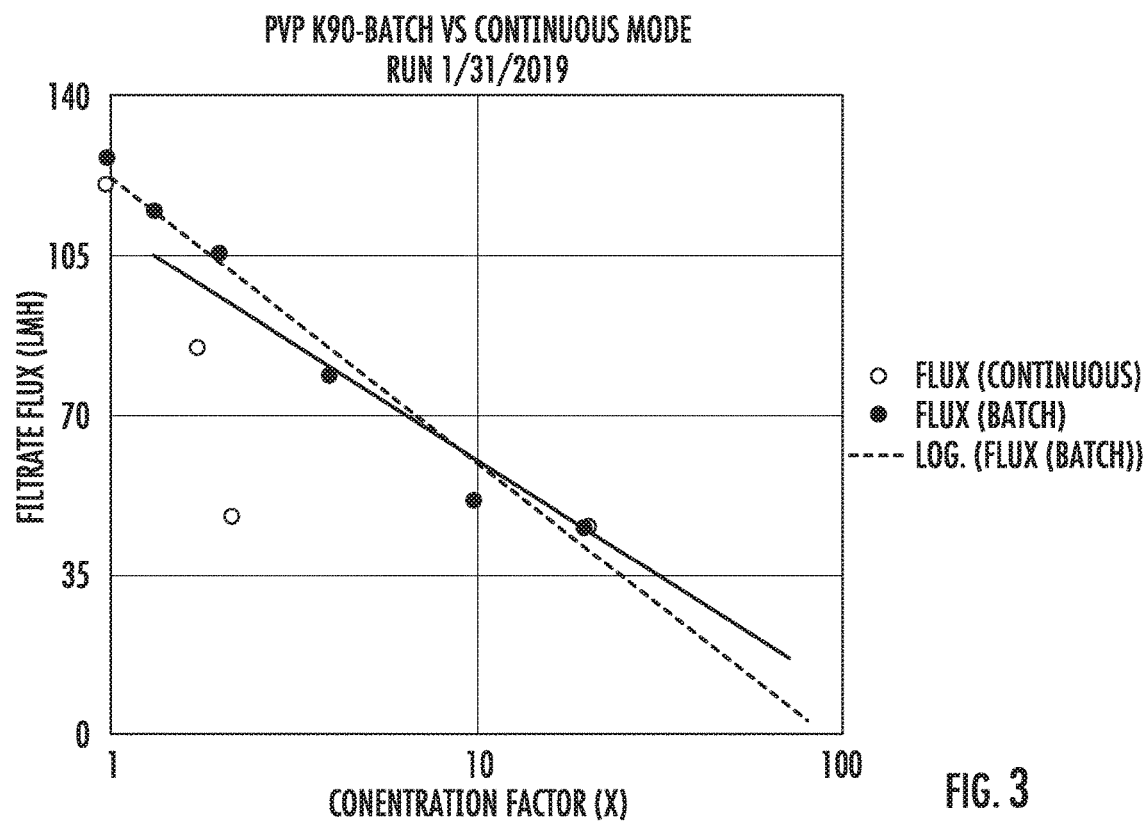
FIG. 3 is an exemplary chart of a flux of a continuous process system versus a batch process system, in accordance with an embodiment of the present disclosure.
Figure 4:
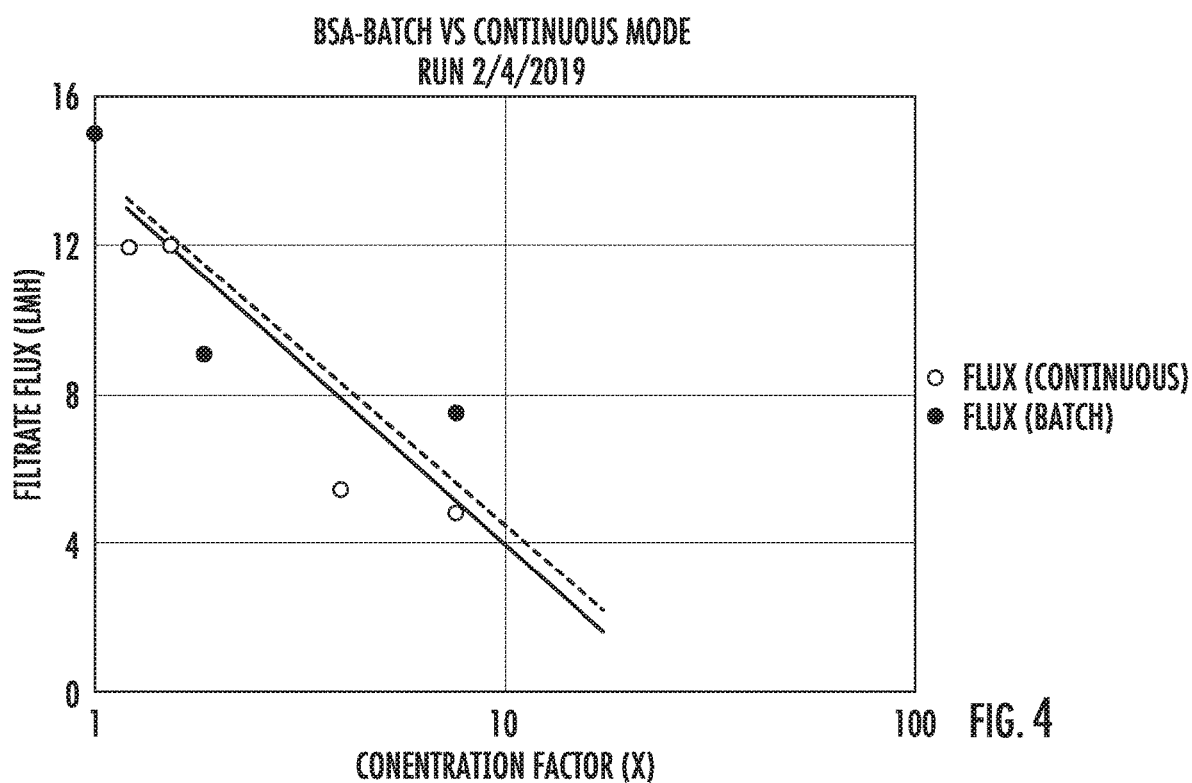
FIG. 4 is another exemplary chart of a flux of a continuous process system versus a batch process system, in accordance with an embodiment of the present disclosure.

In FIGS. 3 and 4, variable data of a flux (L/m$^2$/hr, LMH) of a continuous process system versus a batch process system is displayed, in accordance with an embodiment of the present disclosure. FIG. 3 depicts data from a synthetic polymer PVP K90 and FIG. 4 depicts data from BSA. The x-axis of FIGS. 3 and 4 displays the concentration factor and the y-axis displays the filtrate flux. Flux may be relevant for batch processes in achieving a concentration factor. Flux may not be a concern in continuous processing system embodiments because the concentration (or conversion ratio) is controlled independent of flux. However, in some systems or with some fluids, a flux may assist with maintaining a functioning membrane over time. For example, a higher flux may assist with clearing buildup or polarization on a membrane than a lower flux would. In FIGS. 3 and 4, the flux of an exemplary continuous process system is similar to and at times higher than the flux of a batch system.

Figure 5:
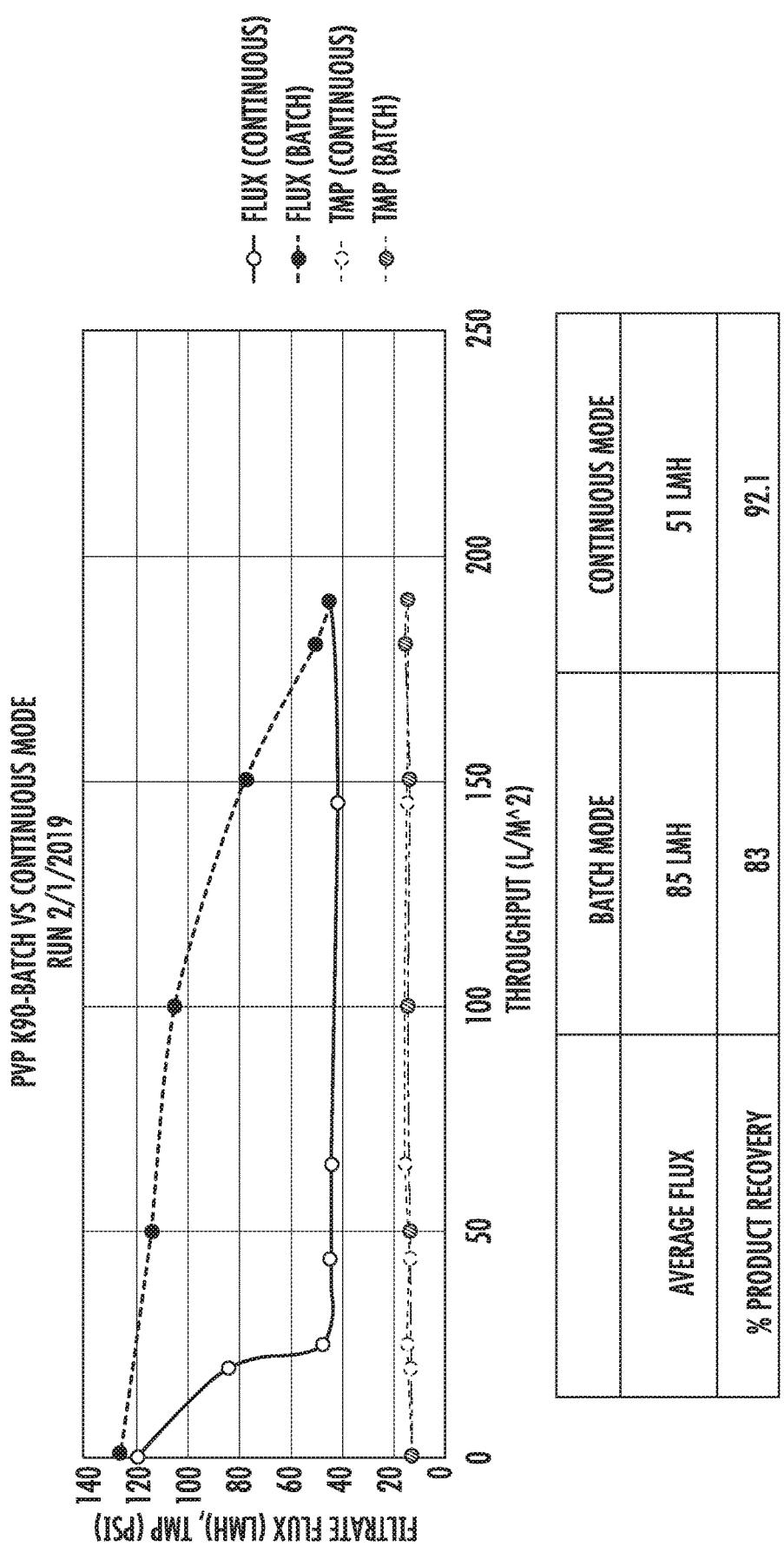
FIG. 5 is an exemplary chart comparing a flux and trans membrane pressure of continuous process system versus a batch process system, in accordance with an embodiment of the present disclosure.

In FIG. 5, variable data of a flux (L/m$^2$/hr, LMH) and trans membrane pressure (lb./in$^2$ (PSI), TMP) of a continuous process system versus a batch process system both with PVP K90 is displayed, in accordance with an embodiment of the present disclosure. The x-axis displays the volumetric flow rate and the y-axis displays the filtrate flux and TMP. The trans membrane pressure is the pressure needed to pass fluid across a membrane of a system. The throughput is the amount of material filtered from the fluid. A flux of both batch and continuous system curves begin higher than the remainder of the curves because the concentration initially has yet to be reached. The flux of the continuous system drops at a steeper rate compared to the flux of the batch system because the concentration of the fluid is more rapidly achieved in the continuous system than in the batch system, at which point the continuous system runs at a substantially constant flux. This allows a user to setup and reliably run a continuous system for extended periods of time at a constant flux rate (e.g., about 40 LMH), compared to the larger and constantly changing batch system that will need to be stopped and maintained at shorter tun time intervals. This consistent flux rate also allows the continuous system to be installed in-line with other process systems because a substantially consistent flux is maintained. The batch system and continuous system were comparably run at a substantially similar TMP of about 16 PSI. The batch system has an average flux of 85 LMH with an 83% product recovery rate, while the continuous system has an average flux of 51 LMH with a comparable product recovery rate of 92.1%. The average flux of the continuous process system is lower than the average flux of the batch process system (about 60% of the average flux of the batch system) because the continuous process system runs at a higher concentration factor for a majority of the run time. If a low flux of a continuous process system is undesirable, the low flux may be alleviated by installing multiple membranes or process systems in series. For example, a first membrane may perform a large portion of the concentration reduction of the fluid at a higher flux rate while a second filter may finish the remainder concentration reduction of fluid at a lower flux rate.

In various embodiments, a method of alternating tangential flow may include feeding a fluid directly from a first fluid process into fluid communication with a membrane. The fluid may be reciprocated tangentially across a membrane. The fluid may be pumped directly from the membrane to a second fluid process. A flux of the fluid reciprocating tangentially across the membrane may be adjusted such that a desired concentration of fluid is pumped from the membrane to the second fluid process. A flux of the fluid pumped from the membrane to the second fluid process may be less than a flux of the reciprocating fluid. The second fluid process may include reciprocating the fluid tangentially across another membrane. The reciprocating step may be performed continuously for more than 24 hours. A ratio of a filtrate fluid flow across the membrane to the fluid flow pumped to the second fluid process may be adjusted to adjust a concentration factor of the fluid pumped to the second fluid process. A flux of the fluid may be metered to the second fluid process. A feeding rate of the fluid in the feeding step may be increased. A frequency of the reciprocating fluid may be increased.

Tangential flow filters in accordance with the present disclosure include tangential flow filters and membranes having pore sizes and depths that are suitable for excluding large particles (e.g., cells, micro-carriers, or other large particles), trapping intermediate-sized particles (e.g., cell debris, or other intermediate-sized particles), microparticles, molecules, and allowing small particles (e.g., soluble and insoluble cell metabolites and other products produced by cells including expressed proteins, viruses, virus like particles (VLPs), exosomes, lipids, DNA, molecules, or other small particles). As used herein a "microcarrier" is a particulate support allowing for the growth of adherent cells in bioreactors.

In this regard, one of the most problematic areas for various filtration processes, including filtration of cell culture fluids such as those filtered in perfusion and harvest of cell culture fluids, is decreased mass transfer of target molecules or particles due to filter fouling. The present disclosure overcomes many of these hurdles by combining the advantages of tangential flow filtration with the advantages of depth filtration. As in standard thin wall hollow fiber filters using tangential flow filtration, cells are pumped through the flow paths of the hollow fibers, sweeping them along the surface of the inner surface of the hollow fibers, allowing them to be recycled for further production. However, instead of the protein and cell debris forming a fouling gel layer at the inner surface of the hollow fibers, the wall adds what is referred to herein as a "depth filtration" feature that traps the cell debris inside the wall structure, enabling increased volumetric throughput while maintaining close to 100% passage of typical target proteins in various embodiments of the disclosure. Such filters may be referred to herein as tangential flow depth filters.

Suitable particles and/or filaments for use in the present disclosure include both inorganic and organic particles and/or filaments. In some embodiments, the particles and/or filaments may be mono-component particles and/or mono-component filaments. In some embodiments, the particles and/or filaments may be multi-component (e.g., bi-component, tri-component, etc.) particles and/or filaments. For example, bi-component particles and/or filaments having a core formed of a first component and a coating or sheath formed of a second component, may be employed, among many other possibilities.

In various embodiments, the particles and/or filaments may be made from polymers. For example, the particles and/or filaments may be polymeric mono-component particles and/or filaments formed from a single polymer, or they may be polymeric multi-component (i.e., bi-component, tri-component, etc.) particles and/or filaments formed from two, three, or more polymers. A variety of polymers may be used to form mono-component and multi-component particles and/or filaments including polyolefins such as polyethylene and polypropylene, polyesters such as polyethylene terephthalate and polybutylene terephthalate, polyamides such as nylon 6 or nylon 66, fluoropolymers such as polyvinylidene fluoride (PVDF) and polytetrafluoroethylene (PTFE), among others.

Particles may be formed into tubular shapes by using, for example, tubular molds. Once formed in a tubular shape, particles may be bonded together using any suitable process. For instance, particles may be bonded together by heating the particles to a point where the particles partially melt and become bonded together at various contact points (a process known as sintering), optionally, while also compressing the particles. As another example, the particles may be bonded together by using a suitable adhesive to bond the particles to one another at various contact points, optionally, while also compressing the particles.

Filament-based fabrication techniques that can be used to form tubular shapes include, for example, simultaneous extrusion (e.g., melt-extrusion, solvent-based extrusion, etc.) from multiple extrusion dies, or electrospinning or electrospraying onto a rod-shaped substrate (which is subsequently removed), among others.

Filaments may be bonded together using any suitable process. For instance, filaments may be bonded together by heating the filaments to a point where the filaments partially melt and become bonded together at various contact points, optionally, while also compressing the filaments. As another example, filaments may be bonded together by using a suitable adhesive to bond the filaments to one another at various contact points, optionally while also compressing the filaments.

In particular embodiments, numerous fine extruded filaments may be bonded together to at various points to form a hollow fiber, for example, by forming a tubular shape from the extruded filaments and heating the filaments to bond the filaments together, among other possibilities.

Conclusion

The present disclosure is not limited to the particular embodiments described. The terminology used herein is for the purpose of describing particular embodiments only, and is not intended to be limiting. Unless otherwise defined, all technical terms used herein have the same meaning as commonly understood by one of ordinary skill in the art to which the disclosure belongs.

Although embodiments of the present disclosure are described with specific reference to cultured mediums, including for use in bioprocessing, it should be appreciated that such systems and methods may be used in a variety of configurations of processing fluids, with a variety of instruments, and a variety of fluids.

As used herein, the singular forms "a," "an," and "the" are intended to include the plural forms as well, unless the context clearly indicates otherwise. The terms "comprises" and/or "comprising," or "includes" and/or "including" when used herein, specify the presence of stated features, regions, steps elements and/or components, but do not preclude the presence or addition of one or more other features, regions, integers, steps, operations, elements, components and/or groups thereof. As used herein, the conjunction "and" includes each of the structures, components, features, or the like, which are so conjoined, unless the context clearly indicates otherwise, and the conjunction "or" includes one or the others of the structures, components, features, or the like, which are so conjoined, singly and in any combination and number, unless the context clearly indicates otherwise. The term "or" is generally employed in its sense including "and/or" unless the content clearly dictates otherwise.

All numeric values are herein assumed to be modified by the term "about," whether or not explicitly indicated. The term "about", in the context of numeric values, generally refers to a range of numbers that one of skill in the art would consider equivalent to the recited value (i.e., having the same function or result). In many instances, the term "about" may include numbers that are rounded to the nearest significant figure. Other uses of the term "about" (i.e., in a context other than numeric values) may be assumed to have their ordinary and customary definition(s), as understood from and consistent with the context of the specification, unless otherwise specified. The recitation of numerical ranges by endpoints includes all numbers within that range, including the endpoints (e.g. 1 to 5 includes 1, 1.5, 2, 2.75, 3, 3.80, 4, and 5).

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

What is claimed is:

1. An alternating tangential flow system for continuous processing comprising:
   a feed line containing a fluid;
   a retentate line in fluid communication with the feed line;
   a first diaphragm at an inlet of the retentate line configured to pump fluid toward an outlet of the retentate line;
   a second diaphragm at the outlet of the retentate line configured to pump fluid toward the inlet of the retentate line;
   a membrane in fluid communication with the retentate line between the first diaphragm and the second diaphragm; and
   a retentate pump at the retentate outlet configured to pump the fluid out of the retentate line.

2. The system of claim 1, wherein the first diaphragm and the second diaphragm are synchronized with each other in an alternating fashion.

3. The system of claim 1, wherein a flux of the retentate pump is less than each of a flux of the first diaphragm and a flux of the second diaphragm.

4. The system of claim 1, wherein the feed line is in fluid communication with a first fluid system process and the retentate line is in fluid communication with a second fluid system process.

5. The system of claim 1, wherein a fluid volume of each of the first diaphragm and the second diaphragm are more than a volume of a portion of the retentate line that is within the membrane.

6. The system of claim 1, furthering comprising a metering valve at the retentate outlet.

7. The system of claim 1, wherein a flux of the feed line is substantially equal to a flux of the fluid of the retentate outlet.

8. The system of claim 1, further comprising:
   a filtrate line in fluid communication with the membrane;
   a first sensor in line with the filtrate line; and
   a second sensor at the retentate outlet.

9. An alternating tangential flow device for continuous processing comprising:
   a housing having a first end and a second end;
   a membrane disposed within the housing, the membrane having a retentate flow path;
   an inlet at the first end of the housing in fluid communication with the retentate flow path;
   a retentate outlet at the second end of the housing in fluid communication with the retentate flow path;
   a filtrate outlet in the housing in fluid communication with the retentate flow path across the membrane;
   a first diaphragm at an inlet configured to pump fluid toward the retentate outlet; and
   a second diaphragm at the retentate outlet configured to pump fluid toward the inlet.

10. The device of claim 9, wherein a fluid volume of each of the first diaphragm and the second diaphragm are more than a volume of the retentate flow path within the membrane.

11. The device of claim 9, wherein the first diaphragm and the second diaphragm are each configured to synchronize with each other in an alternating fashion.

12. The device of claim 9, further comprising a metering valve at the retentate outlet.

13. A method of alternating tangential flow in the system of claim 1, the method comprising:
   feeding the fluid directly from a first fluid process into fluid communication with the membrane;
   reciprocating the fluid tangentially across the membrane; and
   pumping the fluid directly from the membrane to a second fluid process.

14. The method of claim 13, further comprising adjusting a flux of the fluid reciprocating tangentially across the membrane such that a desired concentration of fluid is pumped from the membrane to the second fluid process.

15. The method of claim 13, wherein a flux of the fluid pumped from the membrane to the second fluid process is less than a flux of the reciprocating fluid.

16. The method of claim 13, wherein the second fluid process comprises reciprocating the fluid tangentially across another membrane.

17. The method of claim 13, wherein the reciprocating step is performed continuously for more than 24 hours.

18. The method of claim 13, further comprising adjusting a ratio of a filtrate fluid flow across the membrane to the fluid flow pumped to the second fluid process to adjust a concentration factor of the fluid pumped to the second fluid process.

19. The method of claim 13, further comprising metering a flux of the fluid to the second fluid process.

20. The method of claim 13, further comprising increasing a feeding rate of the fluid in the feeding step and increasing a frequency of the reciprocating fluid.

* * * * *